United States Patent [19]

Laumond et al.

[11] Patent Number: 4,862,023
[45] Date of Patent: Aug. 29, 1989

[54] SYNCHRONOUS MACHINE WITH SUPERCONDUCTING WINDINGS

[75] Inventors: Yves Laumond, Andelnans; Jean-Louis Sabrié, Cravanche, both of France

[73] Assignee: Societe Anonyme dite : ALSTHOM, Paris Cedex, France

[21] Appl. No.: 206,391

[22] Filed: Jun. 14, 1988

Related U.S. Application Data

[63] Continuation-in-part of Ser. No. 920,500, Oct. 20, 1986.

[30] Foreign Application Priority Data

Oct. 17, 1985 [FR] France .................. 85 15416

[51] Int. Cl.$^4$ .............................................. H02K 9/00
[52] U.S. Cl. ........................................ 310/54; 310/10; 310/90; 310/254; 310/261; 277/53
[58] Field of Search ............... 310/10, 40 R, 52, 53, 310/58, 59, 61, 64, 54, 90, 261, 162, 165, 184, 208, 254; 277/53–57; 336/DIG. 1

[56] References Cited

U.S. PATENT DOCUMENTS

| | | | |
|---|---|---|---|
| 3,242,418 | 3/1966 | Mela | 310/52 |
| 3,940,643 | 2/1976 | Sika | 310/52 |

FOREIGN PATENT DOCUMENTS

| | | | |
|---|---|---|---|
| 0221404 | 5/1987 | European Pat. Off. | |
| 3207061 | 9/1983 | Fed. Rep. of Germany | 310/52 |
| 2589017 | 4/1987 | France | |
| 62-95962 | 5/1987 | Japan | |

Primary Examiner—R. Skudy
Attorney, Agent, or Firm—Sughrue, Mion, Zinn, Macpeak & Seas

[57] ABSTRACT

A synchronous machine having a rotor which is fixed to a shaft supported in bearings, said machine having its rotor (1) and stator (2) windings cooled by very low temperature helium, with each of the windings and the gap (4) therebetween being in a vacuum enclosures. The said rotor and stator windings and the said gap are disposed inside a common enclosure (13) connected to a common vacuum source (17), and said gap is separated from the bearings (14) of the rotor shaft (3) by vacuum-resisting oil seals (15) and by cryogenic traps (16).

1 Claim, 1 Drawing Sheet

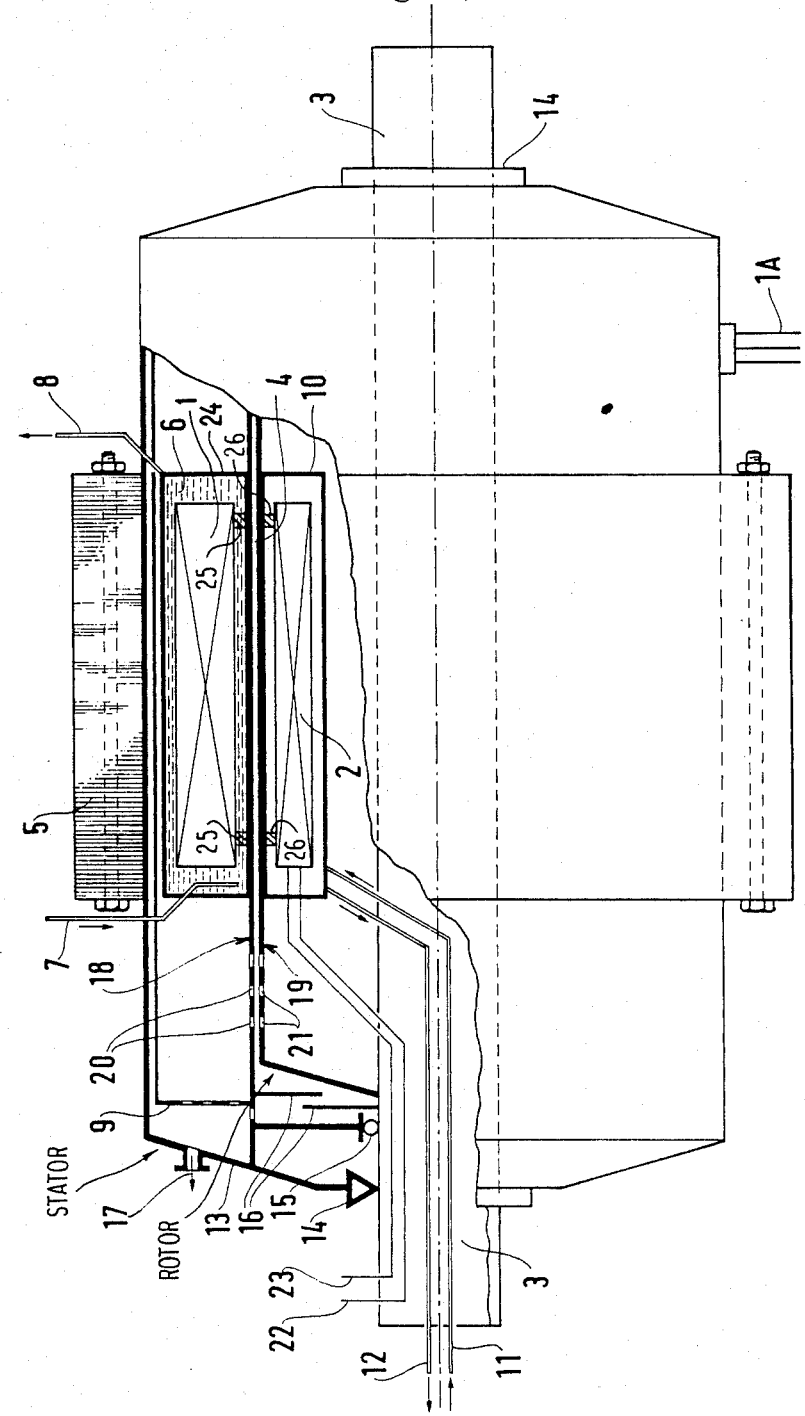

SYNCHRONOUS MACHINE WITH SUPERCONDUCTING WINDINGS

This application is a continuation-in-part application of application Ser. No. 920,500, filed Oct. 20, 1986.

The present invention relates to a synchronous machine having a rotor which is fixed to a shaft supported in bearings, said machine having its rotor and stator windings cooled by very low temperature helium, with each of the windings and the gap therebetween being in a vacuum enclosure.

BACKGROUND OF THE INVENTION

In order to reduce heat losses, the stator, the rotor, and the gap therebetween are maintained in a vacuum, with the stator and the rotor each requiring a nigh vacuum, of about $10^{-4}$ milibars, while the vacuum in the gap therebetween my be considerably less, since its main role is to reduce friction losses. Permanent pumping is provided on the stator in order to maintain the high vacuum. The motor is preferably in a sealed vacuum. However, when the machine is cooled down, a high degree of differential contraction takes place between the hot part of the rotor in the vicinity of the gap and its cold part which needs to be brought down to about 4° K., for example by a flow of helium at above its critical pressure. This requires the use of members capable of absorbing the differential contraction of the stator and the rotor, thereby complicating its construction. Finally, given the differential contraction between the rotor and the stator, the gap therebetween must be rather large.

Preferred implementations of the present invention provide a synchronous machine having a cooling system and a rotor which are of simpler construction and its gap may be smaller.

SUMMARY OF THE INVENTION

The present invention provides a synchronous machine having a rotor which is fixed to a shaft supported in bearings, said machine having its rotor and stator windings cooled by very low temperature helium, with each of the windings and the gap therebetween being in a vacuum enclosure, wherein the said rotor and stator windings and the said gap are disposed inside a common enclosure which is connected to a common vacuum source, and wherein said gap is separated from the bearings of the rotor shaft by vacuum-resisting oil seals and by cryogenic traps.

A synchronous machine in accordance with the invention preferably includes at least one of the following features:

the stator is surrounded by a bath of liquid helium; and the rotor is contained in an enclosure having hypercritical helium flowing therethrough.

BRIEF DESCRIPTION OF THE DRAWING

An embodiment of the is described by way of example with reference to sole figure of the accompanying drawing, which shows a synchronous alternator having superconducting stator and rotor windings in accordance with the invention, shown in a partially cutaway elevation.

MORE DETAILED DESCRIPTION

The alternator comprises a stator fixedly mounting at 25 three-phase stator windings 1 of superconducting material and a rotor fixedly mounting at 26 rotor windings 2, which are likewise superconducting. Three-phase conductors 1A run from the stator to a load. The rotor is supported on a shaft 3 and its periphery is separated from the stator by a gap 4. A laminated magnetic circuit 5 is disposed around the stator and prevents magnetic flux from leaving the machine.

The stator windings are kept in a enclosure 24 of a bath of liquid helium 6 at a temperature of 4.2° K., with liquid helium being inserted into the bath via a duct 7 and with the helium vapor which is formed being evacuated via a duct 8. A heat screen 9 made of reflecting sheets separated by insulating layers is disposed around the windings.

The rotor windings are contained in an enclosure 10 having helium flowing therethrough above its critical pressure, for example a three bars and 4.7° K., the helium arriving via a duct 11 and leaving via a duct 12 after being heated. The rotor windings are connected to a power supply network by conductors 22 and 23.

The helium inlet and outlet may be sealed, for example by a rotary seal (not shown) such as that described in published French patent specification No. 2 319 233 or in its certificate of addition published under No. 2 371 806, in the names of the present assignee and Electricite de France.

The stator and rotor assembly is contained in a common envelope 13 including the bearings 14 for supporting the rotor shaft 3. The inside of the envelope 13 is separated from ambient air by means of vacuum-resisting oil seals 15 followed by oil vapor cryogenic traps 16.

The enclosure inside the envelope 13 containing the stator, the rotor, and the gap therebetween, is connected to a common vacuum source 17. The stator is separated from the gap by a thermal transition and torque transmission tube 18, and the rotor is separated therefrom by a tube 19. These tubes have openings 20 and 21 for providing vacuum communication between the stator and the gap and the rotor.

What is claimed is:

1. In a synchronous machine having a rotor fixed to a shaft and said rotor having superconducting rotor windings, bearings rotatably supporting said shaft, a stator having superconducting stator windings about said rotor, and a gap between said rotor and said stator, means for cooling said rotor and said stator windings by very low temperature helium, the improvement wherein said rotor and stator windings and said gap are disposed inside a common enclosure connected to a common vacuum source, wherein vacuum-resisting oil seals and cryogenic traps separate said gap from said bearings of said shaft, and wherein said means for cooling said stator windings comprises a bath of liquid helium surrounding said stator windings, wherein said rotor windings are contained inside a rotor enclosure, and said machine further comprises means for flowing hypercritical helium inside rotor enclosure for cooling said rotor windings.

* * * * *